(12) United States Patent
Ando

(10) Patent No.: US 8,736,562 B2
(45) Date of Patent: May 27, 2014

(54) INPUT MEMBER AND ELECTRONIC DEVICE HAVING SAME

(75) Inventor: Hitoshi Ando, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 610 days.

(21) Appl. No.: 13/044,868

(22) Filed: Mar. 10, 2011

(65) Prior Publication Data

US 2011/0234517 A1    Sep. 29, 2011

(30) Foreign Application Priority Data

Mar. 29, 2010 (JP) ................................. 2010-075790

(51) Int. Cl.
*G06F 3/041* (2006.01)

(52) U.S. Cl.
USPC ...................................... 345/173; 178/18.01

(58) Field of Classification Search
CPC . G06F 3/03547; G06F 3/045; G06F 3/04883; G06F 3/04886; G06F 2203/0339
USPC ........... 345/173–184; 340/995.17, 4.12, 5.62, 340/407.1–407.2, 815.47–815.48; 341/5, 341/22, 27, 33, 34, 455, 456; 708/142; 178/18.01–20.04
See application file for complete search history.

(56) References Cited

U.S. PATENT DOCUMENTS

| 7,245,249 B2* | 7/2007 | Hanahara et al. ............. 341/176 |
| 7,852,321 B2* | 12/2010 | Uotani et al. ................... 345/160 |
| 2006/0001655 A1* | 1/2006 | Tanabe ............................ 345/176 |
| 2007/0257821 A1* | 11/2007 | Son et al. ......................... 341/22 |
| 2007/0257886 A1* | 11/2007 | Uotani et al. ................... 345/160 |
| 2008/0202824 A1* | 8/2008 | Philipp et al. ............... 178/18.01 |
| 2009/0140996 A1 | 6/2009 | Takashima et al. |
| 2009/0146848 A1* | 6/2009 | Ghassabian ..................... 341/22 |
| 2009/0229892 A1* | 9/2009 | Fisher et al. ................ 178/18.03 |
| 2011/0157102 A1* | 6/2011 | Ando et al. ..................... 345/184 |
| 2011/0181445 A1* | 7/2011 | Sato ................................ 341/22 |

FOREIGN PATENT DOCUMENTS

| CN | 101446869 | 6/2009 |
| JP | 06-176663 | 6/1994 |
| JP | 2009-503687 | 1/2009 |
| JP | 2009-134473 | 6/2009 |
| JP | 2010-009095 A | 1/2010 |
| JP | 2011-192210 | 9/2011 |
| WO | 2007-015959 | 2/2007 |

* cited by examiner

*Primary Examiner* — Amare Mengistu
*Assistant Examiner* — Vinh Lam
(74) *Attorney, Agent, or Firm* — Harness, Dickey & Pierce, P.L.C.

(57) ABSTRACT

The present application provides an input member and an electrical device that includes the input member in which a slide operation can be performed, and in which a predetermined input value for each position touched by a user can be entered. The input member includes that one or a plurality of conductive elastic bodies; an operation plate that has an operation plane and that has the conductive elastic bodies on a rear surface side of the operation plane; a base plate including a group of electrodes, the electrodes being provided at positions opposite to the conductive elastic bodies without contacting each other; and a plurality of protruding parts protruding from the conductive elastic bodies toward the base plate are aligned in a predetermined direction.

8 Claims, 6 Drawing Sheets

| Time (sec) | First Electrode 22 vs Second Electrode 23a (V) | First Electrode 22 vs Second Electrode 23b (V) | First Electrode 22 vs Second Electrode 23c (V) | First Electrode 22 vs Second Electrode 23d (V) | First Electrode 22 vs Second Electrode 23e (V) |
|---|---|---|---|---|---|
| 0.00 | 3 | 3 | 3 | 3 | 3 |
| 0.25 | 1 | 2 | 3 | 3 | 3 |
| 0.50 | 2 | 1 | 2 | 3 | 3 |
| 0.75 | 3 | 2 | 1 | 2 | 3 |
| . . . | . . . | . . . | . . . | . . . | . . . |

INPUT MEMBER AND ELECTRONIC DEVICE HAVING SAME

CROSS REFERENCE

The present application is related to, claims priority from and incorporates by reference Japanese patent application number 2010-075790, filed on Mar. 29, 2010.

TECHNICAL FIELD

The present application relates to an input member and an electronic device that has the input member. The present application can be used as an input member or the like for a wide variety of electronic devices.

RELATED ART

Traditionally, touch panels have been used as input members for operating electronic devices, such as in-car devices, mobile phones, and audio equipment. Through touch panels, a wide variety of the following input operations can be performed: a touch operation that is for selecting a desired icon or the like and a slide operation that is for sliding in a desired direction corresponding to a finger being left in contact with the touch panel. As an input member in which a slide operation can be detected, there is a resistive touch panel that is disclosed in Japanese patent application laid-open number JP 2010-009095.

However, an invention disclosed in the above Japanese laid-open patent publication has the following problem. That is, when a user performs an operation in which a touch panel is touched by the user, an input value that corresponds to the touched position may not be entered. In other words, a different input value that corresponds to another position other than the touched position may be entered even though the user touches the touched position. This is because in a resistive touch panel, an electrical resistance value between a certain position and a touched position can be changed by an environmental situation such as, for example, ambient temperature.

SUMMARY

In consideration of the situation described above, the present application is provided. An object of the present application is to provide an input member and an electronic device in which a slide operation can be performed, and in which a predetermined input value for each position touched by a user can be entered.

In order to attain the above object, one embodiment of an input member according to the present application is as follows: an input member includes one or a plurality of conductive elastic bodies, an operation plate that has the conductive elastic bodies on a rear surface side of the operation plane, a base plate including a group of electrodes, the electrodes being provided at positions opposite to the conductive elastic bodies without contacting each other (so that the electrodes do not contact each other), and a plurality of protruding parts protruding from one or a plurality of the conductive elastic bodies toward the base plate are aligned in a predetermined direction.

Further, the group of electrodes include a plurality of first electrodes in a multi-tooth shape and a plurality of second electrodes in a multi-tooth shape so as to be located in parallel to each other and to alternate without contacting each other. Note that the plurality of electrodes may include a single electrode.

Further, each of two or more of the conductive elastic bodies has a protruding part. The conductive elastic bodies are separately located on the operation plate so that the protruding parts face the base plate.

Further, it may be preferable that the operation plate is configured with two rectangular-shaped plates that cross each other.

Further, it may be preferable that a front surface of the operation plate is flat.

Further, a thickness of the vicinity of a center part of the operation plate in a longitudinal direction is the thickest. A thickness of the vicinity of both ends of the operation plate in the longitudinal direction is thinner than that of the center part.

One embodiment of an electronic device according to the present application includes the following: an input member includes one or a plurality of conductive elastic bodies, an operation plate that has the conductive elastic bodies on a rear surface side of the operation plane, a base plate including a group of electrodes, the electrodes being provided at positions opposite to the conductive elastic bodies without contacting each other (so that the electrodes do not contact each other) and a plurality of protruding parts protruding from one or a plurality of the conductive elastic bodies toward the base plate are aligned in a predetermined direction, and a base plate including a group of electrodes that include first and second electrodes, the electrodes being provided at positions opposite to the conductive elastic bodies without contacting each other; and a control unit that is provided inside or outside the input member. Further, the control unit includes the following: a measurement unit that measures an electrical resistance value, a voltage value, or a current value, which is varied in accordance with a degree of electrical contact between the first electrode and the second electrode of the group of electrodes through the conductive elastic bodies, at predetermined time intervals; a position specifying unit that specifies at least an operation position based on a measurement value that is measured by the measurement unit or a numerical value that corresponds to the measurement value; and an operation type specifying unit that specifies either a slide operation that corresponds to continuous touching of the operation plate or a touch operation that corresponds to touching a desired position of the operation plate, based on a relationship between a measurement time and the operation position that is specified by the position specifying unit.

The control unit further includes a touch operation determination unit that determines whether the measurement value or the numerical value that corresponds to the measurement value exceeds a first threshold value or not before the operation type specifying unit specifies that the touch operation is performed. Then, it is preferable that the operation type specifying unit specifies that the touch operation is performed when the measurement value or the numerical value exceeds the first threshold value as an additional condition.

The control unit further includes a slide operation determination unit that determines whether the measurement value or the numerical value that corresponds to the measurement value exceeds a second threshold value or not before the operation type specifying unit specifies that the slide operation is performed. Then, it is preferable that the operation type specifying unit specifies that the touch operation is performed when the measurement value or the numerical value exceeds the first threshold value as an additional condition. It is also preferable that the first threshold value exceeds the second threshold value in a memory unit.

An effect of the present application is to provide an input member and an electronic device in which a slide operation can be performed, and in which a predetermined input value for each position touched by a user can be entered.

DETAILED DESCRIPTION

Hereinafter, preferred embodiments according to the present application of an input member and an electronic device that has the input member will be explained with reference to the drawings. As an example of the electronic device, a temperature control member for an air conditioner 1 of an automobile is explained in an embodiment below.

[Configuration of Input Member]

Figure 1:
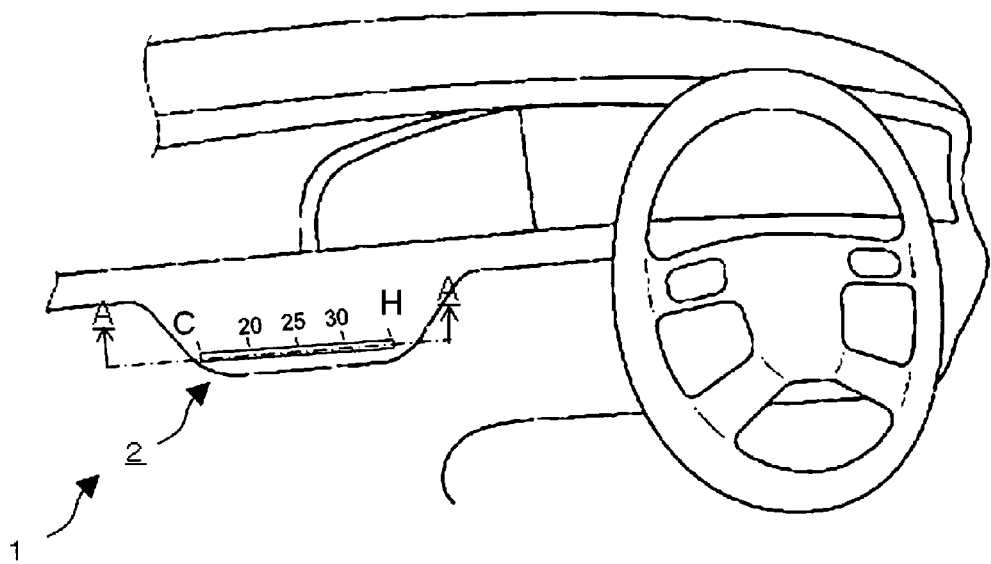
FIG. 1 is a perspective view of an electronic device that has an input member of an embodiment according to the present application.

FIG. 1 is a perspective view of the air conditioner 1 of an automobile as an electronic device of an embodiment according to the present application. As shown in FIG. 1 and as an example of an electronic device of an embodiment according to the present application, the air conditioner 1 of an automobile has an input member 2.

Figure 2:
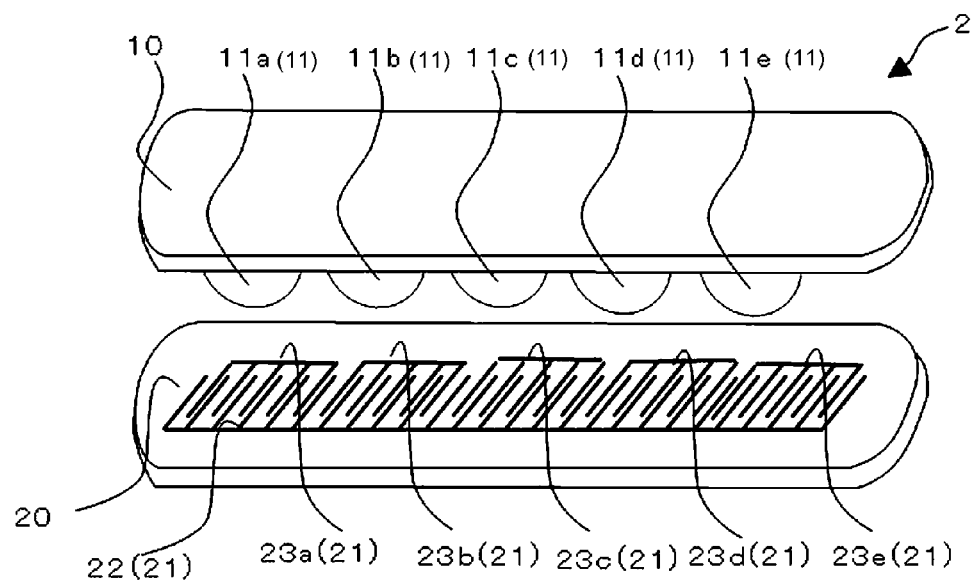
FIG. 2 is an exploded perspective view of an input member of an embodiment according to the present application.
Figure 3:
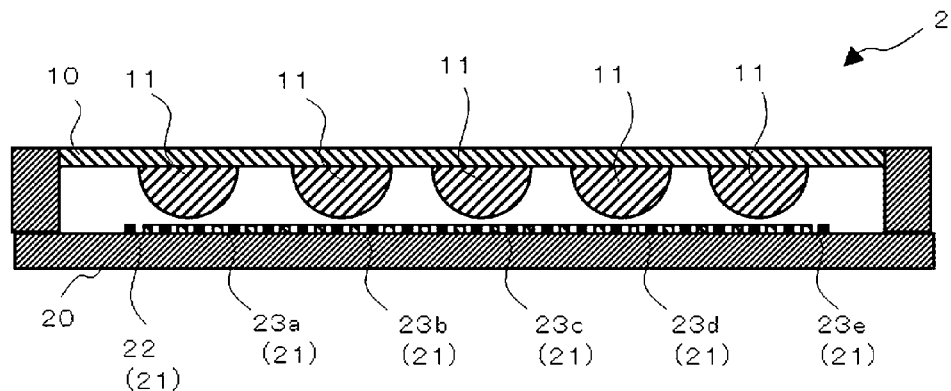
FIG. 3 is a sectional view of an input member taken along line A-A shown in FIG. 1.

FIG. 2 is an exploded perspective view of the input member 2 of an embodiment according to the present application. FIG. 3 is a sectional view of the input member 2 when the input member 2 is cut by a plane perpendicular to an operation plane along line A-A shown in FIG. 1. In FIG. 3, a ratio of a thickness of each member is changed in consideration of viewability.

The input member 2 mainly includes an operation plate 10 and a base plate 20 that is located to face a rear surface side of the operation plate 10. The operation plate 10 is exposed on an operation plane side of the input member 2. A conductive elastic body 11 is protruded from an opposite surface of the operation plane side of the operation plate 10 toward the base plate 20. As an electrode pattern, a group of electrodes 21 is formed on a position of the base plate 20 opposite to the conductive elastic body 11. In this embodiment, the conductive elastic body 11 does not contact with the group of electrodes 21. However, it is not limited to this embodiment. The conductive elastic body 11 may contact with the group of electrodes 21.

The operation plate 10 is a part touched by a user. For example, a sheet-like member with the following dimensions can be used as the operation plate 10: 1.5 cm wide, 10 cm long, and 1 mm thick. Any materials can be used for the operation plate 10 so long as it can be locally deformed. The operation plate 10 may be made of resin, metal, or a composite thereof. The operation plate 10 may be fixed to a front surface side of a thin elastic sheet (not shown) and then be fixed to a housing of the air conditioner 1.

Figure 4:
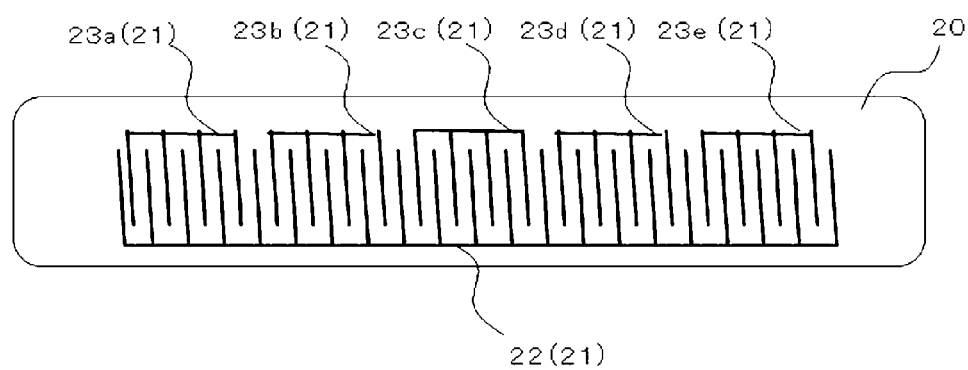
FIG. 4 is a plan view of a base plate, which is seen from an operation plane side, of an input member shown in FIG. 1.
Figure 5:
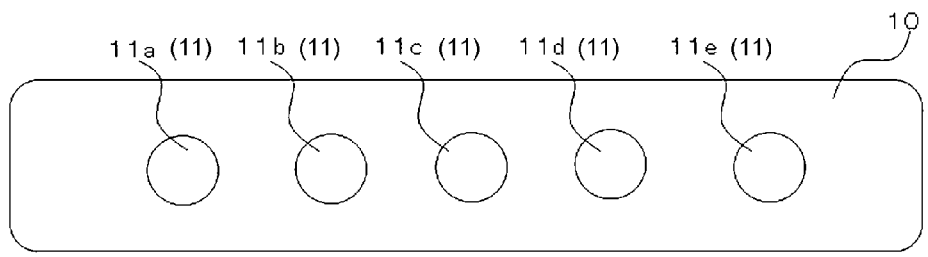
FIG. 5 is a plan view of an operation plate, which is seen from an opposite side to an operation plane side, of an input member shown in FIG. 1.

FIG. 4 is a plan view of the base plate 20, which is seen from the operation plane side, of the input member 2. FIG. 5 is a plan view of the operation plate 10, which is seen from an opposite side to the operation plane side, of the input member 2.

The conductive elastic body 11 is a conductive elastic body having a nearly hemispherical shape with a diameter of 2 to 10 mm. A spherical part of the conductive elastic body 11 has a protruding part protruding toward the base plate 20. A total of five conductive elastic bodies 11a, 11b, 11c, 11d, and 11e (collectively hereinafter referred to as "conductive elastic body 11") are fixed in line in a longitudinal direction of the operation plate 10. Specifically, it is preferable that each center of the conductive elastic bodies 11 is provided in a linear manner in the longitudinal direction of the operation plate 10.

When a user touches the operation plate 10, the conductive elastic body 11 contacts a top surface of the base plate 20. The conductive elastic body 11 is made of a material with great elasticity in order to be elastically deformable according to applied pressure when the conductive elastic body 11 contacts the top surface of the base plate 20. It is preferable that shore A hardness of the conductive elastic body 11 is, for example, 50 degrees through 90 degrees. A conductive material is dispersed in the conductive elastic body 11 in order to apply electrical conductivity. As a conductive material dispersed in the conductive elastic body 11, for example, carbon black or metal can be used. It is preferable to use a small particle size (for example, nanosized particle), specifically carbon black because it is easy to handle. Urethane resin, thermoset elastomer, thermoplastic elastomer (TPE), natural rubber, and so on can each be used as a base material for the conductive elastic body 11. It is preferable to use silicone rubber, one example of the thermoset elastomer, among the aforementioned base materials. In view of increasing electrical conductivity and maintaining elasticity of the silicone rubber, it is preferable that a mixed quantity of the conductive material is in a range of 5-50% by weight (wt %) with respect to the total quantity of the silicone rubber and the conductive material. It is further preferable that a mixed quantity of the conductive material is in a range of 15-35 wt %.

For example, a printed-circuit board (PCB) can be used for the base plate 20. The group of electrodes 21 is formed on a front surface side of the base plate 20 opposite to the conductive elastic body 11.

The group of electrodes 21 detects a change in pressure through the conductive elastic body 11. The change in pressure is applied toward a rear surface side direction of the operation plate 10 from above and is created when a user finger touches the operation plate 10. The group of electrodes 21 is mainly configured with a first electrode 22 and second electrodes 23a, 23b, 23c, 23d and 23e (collectively hereinafter referred to as "second electrodes 23"). The second electrodes 23a, 23b, 23c, 23d and 23e are located at opposite positions that correspond to the conductive elastic bodies 11a, 11b, 11c, 11d and 11e, respectively. The first and second electrodes 22 and 23 are in a multi-tooth shape so as to be located in parallel to each other and to alternate without contacting each other. Specifically, an open part of the multi-tooth shape of the first electrode 22 that is provided in a longitudinal direction of the group of electrodes 21 is located to face in a short direction of the group of electrodes 21. The second electrodes 23 are located in parallel to the first electrode 22 and to alternate without contacting the first electrode 22.

When the conductive elastic bodies 11 contact the group of electrodes 21 in the multi-tooth shape from above, at first the first electrode 22 and at least a corresponding one of the second electrodes 23 are electrically connected with each other through the conductive elastic body 11. When a further load is applied to the operation plate 10 by the user's finger in a direction toward the base plate 20, the conductive elastic body 11 is further pressed toward the base plate 20 through elastic deformation in accordance with the applied load. When a contact area between the conductive elastic body 11 and the group of electrodes 21 increases, an electrical resistance value between the first electrode 22 and the second electrode 23 decreases. Therefore, the electrical resistance value detected between the first electrode 22 and the second electrode 23 is changed according to the applied load to the conductive elastic body 11. A current value and a voltage value between the first electrode 22 and the second electrode 23 are also changed in accordance with the change of the electrical resistance value therebetween.

Both an operation in which a desired position is lightly touched (i.e. a touch operation) and an operation in which a touching finger slides in a desired direction while the finger is left in contact with a touch panel (i.e. a slide operation) can be detected by the input member 2 that includes the above mentioned structures and features.

When a user performs the touch operation by lightly touching a position that is a part of the operation plate 10 with a finger, one or a plurality of conductive elastic bodies 11 that is located at the touched position or close to the touched position is pressed down. The largest load is applied at the touched position that is touched by the user. The applied load is smaller as a position is away from the touched position. Therefore, the conductive elastic body 11 that is proximate to the touched position among the conductive elastic bodies 11 contacts the group of electrodes 21 with the largest area. As a result, a position of the second electrode 23 in which the lowest electrical resistance value is obtained can be specified as a position touched by the user. The input member 2 that includes the above mentioned structures and features enables entry of an input value corresponding to a touched position even though an environmental situation, for example a temperature, is changed. Thus, the input member 2 is different from a resistive touch panel.

The above mentioned operation plate 10 of the input member 2 includes a smooth operation surface. Thus, the user can slide a finger in a longitudinal direction while the finger is left in contact with the operation plate 10. When the user performs a slide operation, the user's finger touches a position corresponding to the adjacent second electrode 23 within a predetermined time. Therefore, performance of the slide operation and the slide direction can be specified by detecting a change of an electrical resistance value, a current value, a voltage value and so on for each of the second electrodes 23 within the predetermined time.

[Brief Configuration of Control Unit]

Figure 6:
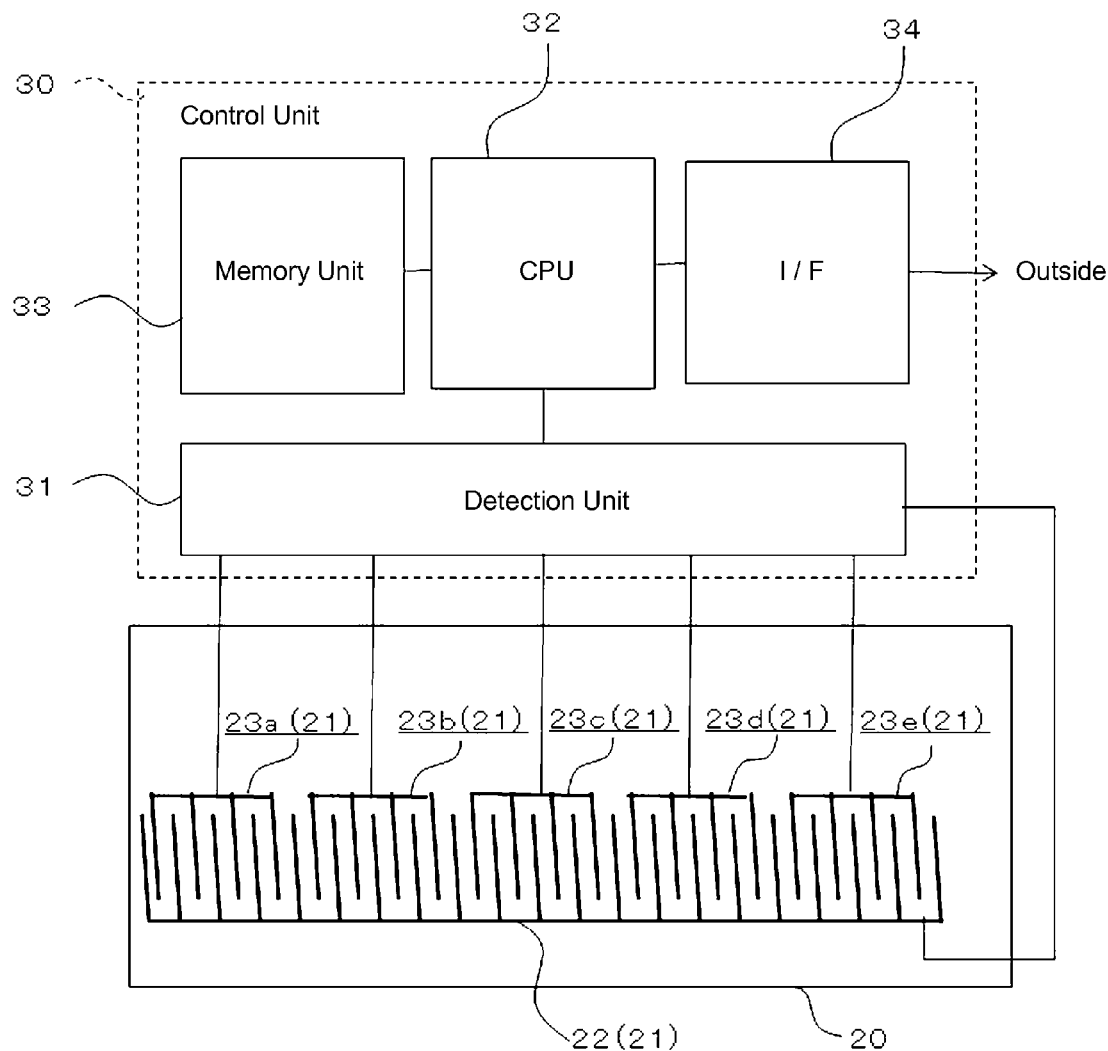
FIG. 6 is a block diagram of a typical air conditioner as an electronic device of an embodiment according to the present application.

FIG. 6 is a block diagram of an exemplary configuration of the air conditioner 1 shown in FIG. 1.

A control unit 30 has the following functions: specifying an operation type (the touch operation or the slide operation) in the input member 2; and specifying a position touched by a finger (operation position). The control unit 30 is configured with, for example, a detection unit 31, a central processing unit (CPU) 32, a memory unit 33, and an interface (I/F) 34. The control unit 30 may be provided on the base plate 20 of the input member 2 or any place other than the base plate 20.

The detection unit 31 applies a voltage between the first electrode 22 and the second electrode 23. A power source for applying the voltage is not shown. Then, when the first electrode 22 and the second electrode 23 are electrically connected with each other through the conductive elastic body 11, the detection unit 31 functions as a measurement unit that measures an electrical resistance value, a voltage value, or a current value as a measurement value that varies according to degrees or states of contact between the conductive elastic body 11 and the first and second electrodes 22, 23. The detection unit 31 sends the measurement value to the CPU 32.

The CPU 32 functions at least as a position specifying unit that specifies a position touched by the user based on the measurement value that is measured by the detection unit 31 or a numerical value that corresponds to the measurement value. The numerical value that corresponds to the measurement value means a numerical value that is determined based on the measurement value. For example, it may be a point that is assigned to the measurement value, or a numerical value that is calculated based on the measurement value. The position specifying unit may specify not only a position touched by the user, but also a degree of touching pressure. The CPU 32 instructs storage of the present measurement value that is measured by the detection unit 31 along with an associated measurement time in the memory unit 33. The CPU 32 also functions as an operation type specifying unit that specifies which operations, the touch operation or the slide operation, are performed by referring to both the present measurement value that is measured by the detection unit 31, and the past measurement value and the measurement time that are stored in the memory unit 33.

The memory unit 33 stores a control program and so on of the control unit 30. The memory unit 33 further can store a measurement value or a numerical value corresponding to the measurement value between the first electrode 22 and the second electrode 23 measured at the time of contact between the conductive elastic body 11 and the group of electrodes 21, and a measurement time in the format of a table or a numerical expression described for each of the second electrodes 23. The memory unit 33 is appropriately configured as, for example, ROM, RAM, VRAM, EEPROM, or the like.

The interface (I/F) 34 receives a signal from outside the control unit 30 and sends a signal to outside the control unit 30. The CPU 32 distributes an order that is input through the input member 2 to each unit through the interface (I/F) 34. Outside the control unit 30 includes outside the air conditioner 1.

Next, an operation flow of the control unit 30 based on an input through the input member 2 is explained.

[Operation Flow of Control Unit]

Figure 7:
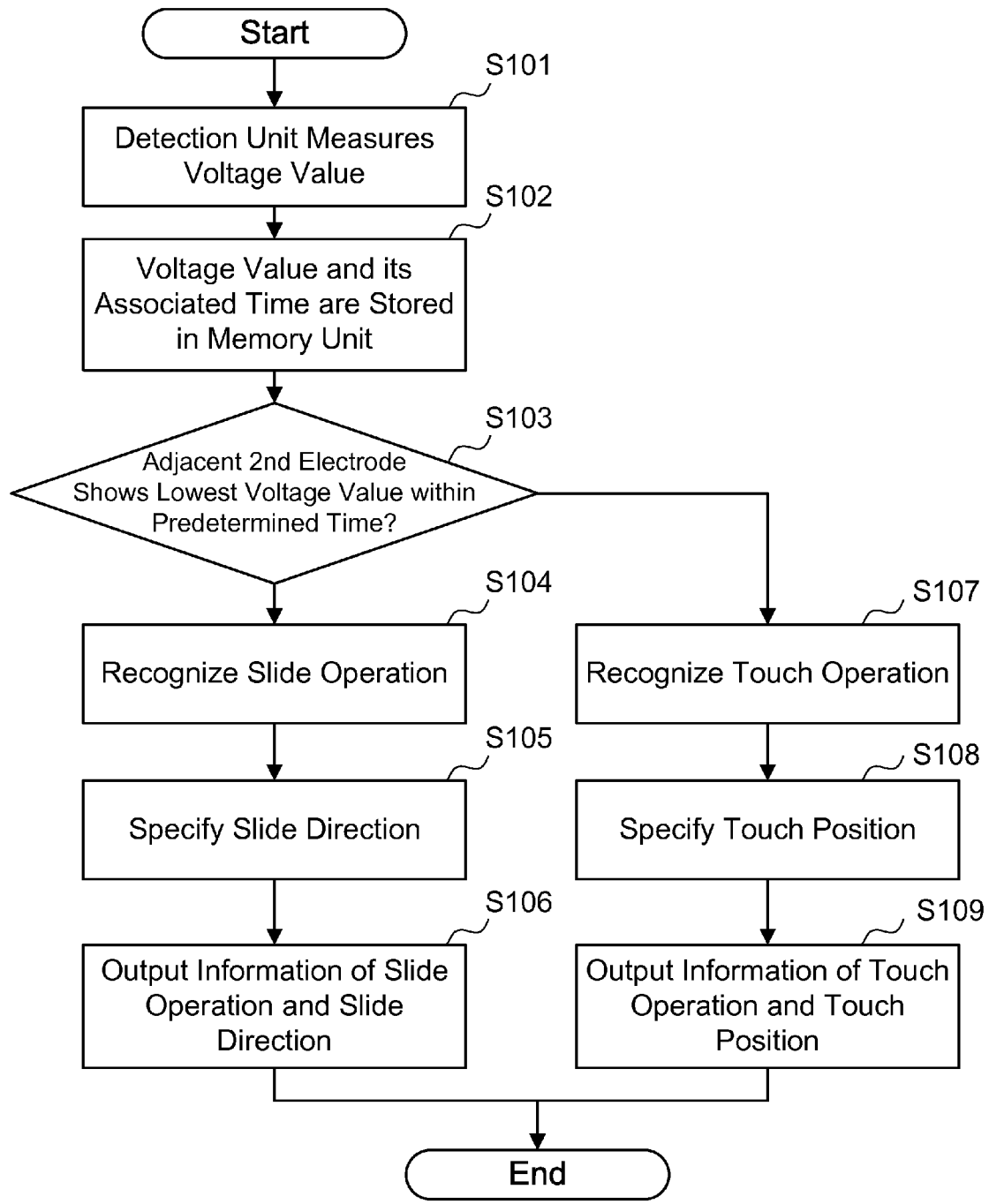
FIG. 7 is a flow diagram for explaining a brief operation flow of an electronic device of an embodiment according to the present application.

FIG. 7 is an example of a flow diagram for showing an operation flow when the input member 2 is operated.

The detection unit 31 measures a voltage value as a measurement value between each of the first electrodes 22 and each of the second electrodes 23 at given time intervals (Step 101, hereinafter S101). At S101, the position specifying unit specifies a position of an electrode touched by a user in accordance with a position of an electrode in which the measurement value is measured. For example, when the user touches the operation plate 10, each of the second electrodes 23 and each of the first electrodes 22 that are proximate to the position touched by the user are electrically connected to each other by the conductive elastic body 11 so that the lowest voltage value is shown compared with others of the electrodes 21. However, the lowest voltage value is not zero. The detection unit 31 measures a voltage value every 0.25 seconds and sends information relating to the measured voltage value or the like to the CPU 32.

Figures 8, 9:
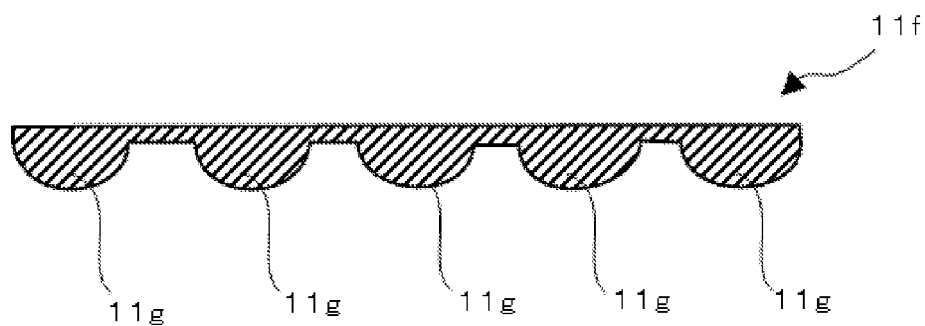
FIG. 8 is a table stored in a memory unit of an electronic device of an embodiment according to the present application.
FIG. 9 is a sectional view of a conductive elastic body of another embodiment according to the present application.

Next, the CPU 32 stores the voltage value and the associated measurement time that are received from the detection unit 31 to be stored in the memory unit 33 (S102). For example, FIG. 8 is an example of a table stored in the memory unit 33. The CPU 32 stores the measurement times and the voltage values to be stored in the table shown in FIG. 8 in the memory unit 33.

Next, the CPU 32 references a voltage value that was measured in the past and stored in the memory unit 33. Then, the CPU 32 determines whether the lowest voltage value of an adjacent position was measured or not within a predetermined time (S103). For example, when the lowest voltage value was measured at the second electrode 23b, the CPU 32 determines whether the lowest voltage value was also measured at either the second electrode 23a or the second electrode 23c in the preceding 0.25 seconds.

When the lowest voltage value is measured at a position adjacent to the position that is specified at S101 within a predetermined time (YES at S103), the CPU 32 recognizes that a slide operation was performed (S104). Then, the CPU 32 specifies a slide direction (S105). For example, when the lowest voltage value is measured at the second electrode 23b and when the lowest voltage value was measured at the second electrode 23a at the time of the previous measurement 0.25 seconds prior to the current measurement, the control unit 30 recognizes that the user slid a finger in the rightward direction on the sheet of FIG. 2. After S105, the CPU 32 outputs information, i.e. the slide operation was performed in the rightward direction, to the outside through the interface (I/F) 34 (S106). As a result, the temperature settings of the air conditioner 1 are raised by one degree C. (1° C.). However, the temperature change is not limited to this embodiment. The temperature settings of the air conditioner 1 may be raised by more than one degree C. (1° C.), or less than one degree C. (1° C.).

On the other hand, at S103, when the lowest voltage value is not measured at a position adjacent to the position that is specified at S101 within a predetermined time (NO at S103), the CPU 32 recognizes that a touch operation was performed (S107). Then, the CPU 32 specifies a position of the second electrode 23 at which the lowest voltage value was measured (where the user touched) (S108). In other words, the CPU 32 specifies the selected temperature settings by the user. The CPU 32 outputs information, i.e. the touch operation was performed, and the position specified at S108, to the outside through the interface (I/F) 34 (S109). For example, when the lowest voltage value is measured at the second electrode 23b and when the lowest voltage value was measured at the second electrode 23e at the time of the previous measurement 0.25 seconds prior to the current measurement, the CPU 32 recognizes that the position of the second electrode 23b was touched by the user and can output information of that position to the outside. Further, when the lowest voltage value is measured at the second electrode 23b and when the lowest voltage value was measured at none of the second electrodes 23 at the time of the previous measurement 0.25 seconds prior to the current measurement, the CPU 32 also recognizes that the position of the second electrode 23b was touched by the user and can output information of that position to the outside. As a result, a temperature of the air conditioner 1 is set at a predetermined temperature assigned to that position.

As discussed above, the CPU 32 specifies a position of the second electrode 23 that is measured as the lowest voltage value at S108. However, it is not limited to this embodiment. For example, when the CPU 32 recognizes that a voltage value was lowered at two positions of the second electrodes 23, the CPU 32 may recognize that a position between these two positions of the second electrodes 23 was pressed. In this case, a position that is touched by a user can be recognized with more precision.

When two or more conductive elastic bodies 11 are pressed, the second electrode 23 in which the lowest voltage value is measured is specified as the position touched by the user as discussed above. However, a position other than the second electrodes 23a, 23b, 23c, 23d and 23e may be recognized as the touched position based on a ratio of measured voltage values of the second electrodes 23. For example, when a voltage value of 1V is measured at the second electrode 23a and a voltage value of 2V is measured at the second electrode 23b, a position that divides a distance between the second electrode 23a and the second electrode 23b by a ratio of 2:1 may be determined as the position touched by the user.

Because the air conditioner 1 includes the above mentioned structures and features, a user can enter an input value through both the slide operation and the touch operation by using the input member 2 of the air conditioner 1. For example, in the case in which temperature settings are operated for the air conditioner 1, when the touch operation is performed, the control unit 30 can set a temperature of the air conditioner 1 to the corresponding temperature of the touched position. When the slide operation is performed, the control unit 30 can control to incrementally adjust a temperature of the air conditioner 1 up and down according to a slide direction.

Preferred embodiments of the input member 2 and the air conditioner 1 as an electronic device that has the input member 2 according to the present application are explained. However, the embodiments are not limited to these structures. It will be apparent that the same may be varied in many ways.

In the above embodiments, the air conditioner 1 of an automobile was explained as an example of an electronic device. An electronic device according to the present application can be used in the following devices as examples other than the air conditioner 1: a mobile phone, a mobile computer, a MP3 player/mobile music player, a portable TV, car audio equipment, and remote controls for the foregoing devices. When the input member 2 is provided for car audio equipment, a user may perform screen scrolling for searching a song through a slide operation and may select a desired song through a touch operation. Further, the input member 2 may be used for an input device other than a control member of the air conditioner 1. For example, it may be a control member for airflow, sound volume, and amount of light. When the input member 2 is used for an electronic device of an automobile, a protrusion, such as a lever and a key, protruded from an operation plane of the input member 2 is not provided. Therefore, when an automobile accident or the like occurs, injuries to a driver and passengers that would otherwise be caused by hitting the protrusion are eliminated.

In the above embodiments, five of the conductive elastic bodies 11 are linearly arranged. However, the embodiments are not limited to these structures. Four or less, or six or more, of the conductive elastic bodies 11 may be arranged. Each of the conductive elastic bodies 11 may not be arranged at even intervals. FIG. 9 is a sectional view of a conductive elastic body 11f of another embodiment that is different from the embodiments discussed above taken along line A-A shown in FIG. 1. As shown in FIG. 9, a plurality of the conductive elastic bodies 11 may be connected on a side of the operation plate 10. In other words, one conductive elastic body 11f may have a plurality of protruding parts 11g which are linearly arranged.

Figure 10:
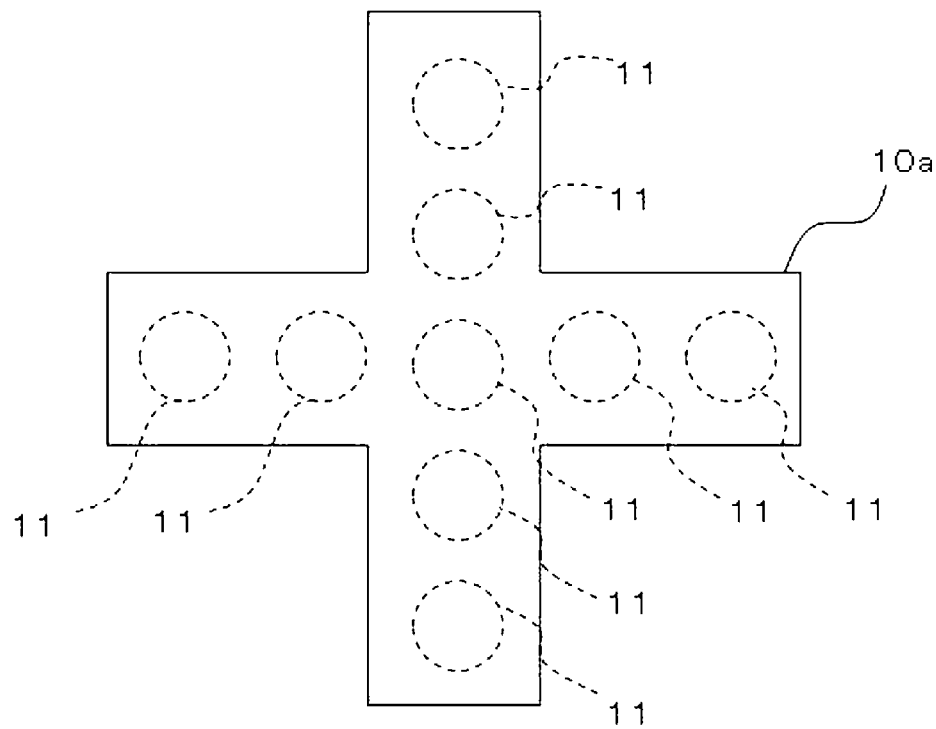
FIG. 10 is a plan view of an operation plane of an operation plate of another embodiment according to the present application.

In the above embodiments, the input member 2 has the operation plate 10 with a rectangular-shaped operation plane. However, the embodiments are not limited to these structures. For example, the operation plate 10 may be in an elliptical shape, a curved belt-like shape, or a part thereof in addition to the rectangular shape. FIG. 10 is a plan view of another embodiment for the operation plate 10 of the input member 2. As shown in FIG. 10, an operation plate 10a of the input member 2 is in a cross shape in which two rectangular-shaped plates cross each other. When an input member includes the operation plate 10a in the cross shape, input operations for the up and down directions in addition to the right and left directions on the sheet of FIG. 10 can be specified by using the same method described in the above embodiments.

Figure 11:
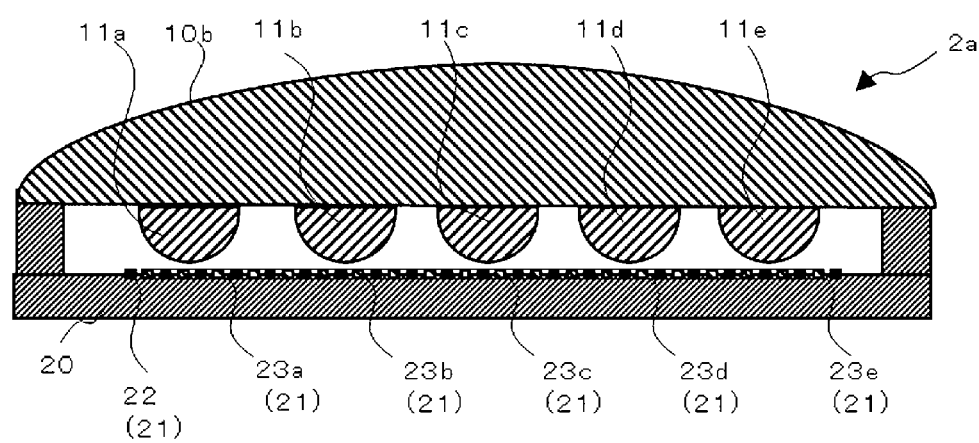
FIG. 11 is a sectional view of an input member of another embodiment according to the present application.

In the above embodiments, the operation plate 10 is configured with a sheet-like member with a nearly uniform thickness. However, the embodiments are not limited to these structures. FIG. 11 is a sectional view of an input member 2a of another embodiment that is different from the embodiments discussed above taken along line A-A shown in FIG. 1. As shown in FIG. 11, an operation plate 10b of the input member 2a may be in a convex shape as a sectional view. Specifically, a thickness of the vicinity of a center part of the operation plate 10b in its longitudinal direction may be made of the thickest material; and a thickness of the vicinity of both ends of the operation plate 10b in its longitudinal direction may be made of a thinner material. When the input member 2a uses the operation plate 10b with uneven thicknesses, the input member 2a can operate in the same manner as the input member 2 that uses the operation plate 10 with nearly uniform thicknesses.

In the above embodiments, the conductive elastic body 11 is made of a rubber-like elastic body. However, the embodiments are not limited to these structures. A conductive elastic body may be a member that is made of conductive resin or conductive metal (preferably a relatively soft material).

In the above embodiments, the group of electrodes 21 is a pair of electrodes having a multi-tooth shape. However, the embodiments are not limited to these structures. An electrode having a semicircular shape may be provided, or an electrode having a quarter circle sector shape can be used for the group of electrodes 21 in addition to the multi-tooth shape. However, an electrode in the multi-tooth shape has an advantage of detection sensitivity even though a force for pressing the operation plate 10 is small, because the conductive elastic body 11 can easily contact both of a pair of electrodes when an electrode has a multi-tooth shape. On the other hand, when an electrode has a sector shape, there is a possibility that the conductive elastic body 11 contacts only one of the pair of electrodes.

In the above embodiments, the detection unit 31 measures a voltage value every 0.25 seconds. However, the embodiments are not limited to these structures. The detection unit 31 may measure a voltage value at certain time intervals that are less than 0.25 seconds or that are more than 0.25 seconds.

In the above embodiments for S103, the CPU 32 determines whether a user touches an adjacent second electrode 23 at the time of the previous measurement 0.25 seconds prior to the current measurement. However, the embodiments are not limited to these structures. The CPU 32 may determine whether the user touches a position inside a predetermined area within a predetermined time. Further in S103, the CPU 32 may determine whether a voltage change occurs at three or more electrodes of the group of electrodes 21 within a predetermined time. Then, when such voltage change occurs, it may be determined that the slide operation is performed. On the other hand, when such voltage change does not occur, it may be determined that the touch operation is performed.

In FIG. 8, the table is shown in which voltage values associated with measurement time for each of the second electrodes 23 are stored. However, the embodiments are not limited to these structures. Only voltage values of the second electrodes 23 that are lower than a predetermined voltage value may be stored in the table. Further, when the CPU 32 calculates a position that is touched by the user based on a measured voltage value, the calculated position may be stored in the table at S102. It is also not limited to an association between the measurement time and the measurement value. The number of measurement and the measurement value may alternatively be associated.

In the above embodiments for S104, the CPU 32 determines whether the touch operation or the slide operation is performed by comparing the present measurement value with the past measurement value stored in the memory unit 33. However, the embodiments are not limited to these structures. The CPU 32 may determine whether the touch operation or the slide operation is performed by comparing the present measurement value with a subsequent measurement value.

In the above embodiments, the slide operation in one direction is shown. However, the embodiments are not limited to these structures. An input member may recognize slide operations in which sliding occurs from both edge portions to a center portion and vice versa by, for example, the use of two fingers. Further, the control unit 30 may specify only the touch operation or only the slide operation. The control unit 30 may also specify the slide operation without specifying a slide direction.

When S103 in FIG. 7 shows "NO," it is preferable to perform the following steps. Before the control unit 30 determines that the touch operation is performed, the touch operation determination unit determines whether the measurement value that is measured by the detection unit 31 or the numerical value that corresponds to the measurement value exceeds a first threshold value that is stored in the memory unit 33. "Exceeding the threshold value" means that the measurement value or corresponding numerical value that indicates a larger degree of electrical contact between the first and second electrodes 22 and 23 (the conductive elastic body 11 contacts the first and second electrodes 22 and 23 in a larger area) is measured compared with the measurement value or corresponding numerical value of the threshold value. Specifically, in the case in which the measurement unit measures a voltage value or an electrical resistance value, when the measured voltage value or the measured electrical resistance value is smaller than a reference value for the threshold value, the control unit 30 can determine that the touch operation is performed. In the case in which the measurement unit measures a current value or a numerical value that is in inverse proportion to the voltage value that is measured by the measurement unit, when the measured current value or the measured numerical value is larger than the reference value for the threshold value, the control unit 30 can determine that the touch operation is performed.

After the control unit 30 determines "NO" at S103 and when the control unit 30 determines that the measurement value or corresponding numerical value exceeds the first threshold value, the control unit 30 can recognize that the touch operation is performed at S107. On the other hand, when the control unit 30 determines that the measurement value or corresponding numerical value does not exceed the first threshold value, the control unit 30 instructs the operation to return to S101. This is because there is a high possibility that touch operations occur in error. As a result, even though a user lightly touches the operation plate 10 in error, the control unit 30 does not recognize that such an error is the intended touch operation because the measurement value or corresponding numerical value for the errant touch operation does not exceed the first threshold value.

Further, when S103 in FIG. 7 shows "YES," it is preferable to perform the following steps. Before the control unit 30 determines that the slide operation is performed, the slide operation determination unit determines whether the measurement value that is measured by the detection unit 31 or the numerical value that corresponds to the measurement value exceeds a second threshold value that is stored in the memory unit 33. After the control unit 30 determines "YES" at S103 and when the control unit 30 determines that the measurement value or corresponding numerical value exceeds the second threshold value, the control unit 30 can recognize that the slide operation is performed at S104. On the other hand, when the control unit 30 determines that the measurement value or corresponding numerical value does not exceed the second threshold value, the control unit 30 instructs the operation to return to S101. In this case, it is preferable that the second threshold value is set to be smaller than the first threshold value. When the user's finger unintentionally touches the input member 2, the control unit 30 tends to determine that the touch operation is performed rather than to determine that the slide operation is performed. Therefore, the control unit 30 becomes difficult to determine an unintentional touch as an input by setting the first threshold value exceeds the second threshold value in the memory unit 33. The slide operation determination unit may determine whether the slide operation is performed before S103 is performed.

The input member and the electrical device that includes the input member being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An electrical device comprising:
 an input member that comprises:
  a plurality of conductive elastic bodies including first and second bodies;
  an operation plate that has an operation plane and that has plurality of conductive elastic bodies on a rear surface side of the operation plane;
  a base plate including a plurality of pair electrodes that include first and second pair electrodes, each of the plurality of pair electrodes being provided by a pair of electrodes without contacting each other at positions opposite to the plurality of conductive elastic bodies; and
  a plurality of protruding parts respectively protruding from the plurality of conductive elastic bodies toward the base plate are aligned in a predetermined direction, the plurality of protruding parts including first and second parts that respectively correspond to the first and second bodies; and
 a control unit that is provided inside or outside the input member, wherein the control unit comprises:
  a measurement unit that measures a measurement value of an electrical resistance value, a voltage value, or a current value, which is varied in accordance with a degree of electrical contact between each of the first and second pair electrodes of the plurality of pair electrodes through the first and second bodies, respectively, at predetermined time intervals;
  a position specifying unit that specifies at least an operation position based on the measurement value that is measured by the measurement unit or a numerical value that corresponds to the measurement value; and
  an operation type specifying unit that specifies either a slide operation that corresponds to moving. an operation position with continuous touching of the operation plate or a touch operation that corresponds to touching a desired position of the operation plate, based on a relationship between a measurement time and the operation position that is specified by the position specifying unit, wherein
 the first and second pair electrodes are located adjacent to each other,
 when a change of the measurement value is detected between each of the first and second pair electrodes within the predetermined time, the operation type specifying unit specifies that the slide operation is performed, and
 when a chance of the measurement value is detected between only one of the first and second pair electrodes within the predetermined time, the operation type specifying unit specifies that the touch operation is performed.

2. The electrical device according to claim 1, further comprising:
 a touch operation determination unit that determines whether the measurement value or the numerical value that corresponds to the measurement value exceeds a first threshold value or not before the operation type specifying unit specifies that the touch operation is performed, and wherein
 the operation type specifying unit specifies that the touch operation is performed when the change of the measurement value is detected between only the one of the first and second pair electrodes within the predetermined time and the measurement value or the numerical value exceeds the first threshold value.

3. The electrical device according to claim 2, further comprising:
 a slide operation determination unit that determines whether the measurement value or the numerical value that corresponds to the measurement value exceeds a second threshold value or not before the operation type specifying unit specifies that the slide operation is performed, and wherein
 the operation type specifying unit specifies that the slide operation is performed when the change of the measurement value is detected between each of the adjacent first and second pair electrodes within the predetermined time and the measurement value or the numerical value exceeds the second threshold value, and the first threshold value exceeds the second threshold value in a memory unit.

4. The electrical device according to claim 1, wherein one of the pair of electrodes of each of the plurality of pair electrodes includes a plurality of first multi-tooth members in a multi-tooth shape, and the other of the pair of electrodes of each of the plurality of pair electrodes includes a plurality of second multi-tooth members in the multi-tooth shape so as to be located in parallel to each other and to alternate without contacting each other.

5. The electrical device according to claim 1, wherein a tip of the plurality of conductive elastic bodies has each of the plurality of protruding parts, and the plurality of conductive elastic bodies are separately located on the operation plate so that the plurality of protruding parts face the base plate.

6. The electrical device according to claim 1, wherein the operation plate is configured with two rectangular-shaped plates that cross each other.

7. The electrical device according to claim 1, wherein a front surface of the operation plate is flat.

8. The electrical device according to claim 1, wherein a thickness of a vicinity of a center of the operational plane in a longitudinal direction is the thickest, and a thickness of a vicinity of both ends of the operation plate in the longitudinal direction is thinner than that of the center part.

* * * * *